United States Patent [19]

Cooper et al.

[11] 4,008,979
[45] Feb. 22, 1977

[54] CONTROL FOR HELICOPTER HAVING DUAL RIGID ROTORS

[75] Inventors: Dean Earl Cooper, Trumbull; Robert Fuller Klingloff, Huntington, both of Conn.

[73] Assignee: United Technologies Corporation, Hartford, Conn.

[22] Filed: Nov. 13, 1975

[21] Appl. No.: 631,600

[52] U.S. Cl. .................................. 416/40; 416/1; 416/33; 416/130; 244/17.23

[51] Int. Cl.² ...................................... B64C 27/80

[58] Field of Search ......... 244/17.13, 17.23, 17.25; 416/33, 40, 114, 115, 130, 127, 112, 113, 129

[56] References Cited

UNITED STATES PATENTS

| | | | |
|---|---|---|---|
| 2,546,881 | 3/1951 | Avery | 416/114 |
| 2,748,876 | 6/1956 | Daland et al. | 416/33 |
| 3,120,276 | 2/1964 | Culver et al. | 416/114 X |
| 3,146,970 | 9/1964 | Girard | 416/114 X |
| 3,199,601 | 8/1965 | Dean et al. | 416/130 X |
| 3,409,249 | 11/1968 | Bergquist et al. | 416/129 X |
| 3,521,971 | 7/1970 | Cheney | 416/33 X |
| 3,570,786 | 3/1971 | Lewis | 416/115 X |
| 3,620,488 | 11/1971 | Miller | 244/17.13 X |
| 3,799,695 | 3/1974 | Yamakawa | 416/40 |

FOREIGN PATENTS OR APPLICATIONS

| | | | |
|---|---|---|---|
| 878,912 | 2/1943 | France | 416/129 |
| 995,459 | 12/1951 | France | 416/115 |
| 791,474 | 3/1958 | United Kingdom | 416/112 |

Primary Examiner—Everette A. Powell, Jr.
Attorney, Agent, or Firm—Vernon F. Hauschild

[57] ABSTRACT

A control for a helicopter having dual, coaxial, counterrotating rigid rotors which varies the cyclic control phase angle of each rotor in flight as a function of vehicle forward speed to thereby control the coupling of lateral cyclic pitch with longitudinal cyclic pitch so as to introduce differential cyclic pitch inputs which automatically produce aerodynamic moments in each rotor to minimize maneuver generated gyroscopic precession moments, which also produce optimum lateral lift vector displacement for all flight speeds.

64 Claims, 14 Drawing Figures

LOOKING REARWARD

CONTROL FOR HELICOPTER HAVING DUAL RIGID ROTORS

The invention herein described was made in the course of or under a contract or sub-contract thereunder, with the Department of the Army.

CROSS-REFERENCE TO RELATED APPLICATIONS

Certain of the subject matter shown and described herein is claimed in a patent application being filed on even date herewith entitled "Analog Mixer to Vary Helicopter Rotor Phase Angle in Flight" in the name of Ronald Durno.

BACKGROUND OF THE INVENTION

1. Field of Invention

This invention relates to flight controls for helicopters and more particularly to such controls for helicopters which have dual, counterrotating, coaxial rotors so as to provide optimum performance and controllability.

2. Description of the Prior Art

While it has been known for some time that there is advantage to be gained by using dual, counterrotating, coaxial, rigid rotors as the lift generating mechanism in a helicopter, certain problems including control problems are involved such that the development of a practical helicopter utilizing such a rotor system is a recent development.

It is interesting to note that when the famed aviation pioneer, Igor I. Sikorsky, built his first helicopter early in the twentieth century, it included a dual, coaxial, counterrotating, rigid motor. Glauert suggested in his book "Aerodynamic Theory" that rotor roll moment might be overcome by using two, counterrotating, rigid rotors. Bergquist, Michel and Fradenburg advanced the art in their U.S. Pat. No. 3,409,248 when they suggested that differential lateral cyclic pitch be varied selectively as a function of aircraft forward speed to both cancel or reduce the roll moments and to optimally position the lift vector of each rotor so as to produce optimum lift-to-drag ratio performance. The mechanism taught in the Bergquist et al patent to accomplish this function was a simple linkage to provide an input directly to the control rods of each rotor either manually or through an air speed sensor which used a computer to derive correct gains. Lewis, in his U.S. Pat. No. 3,570,786, suggested the coupling of collective stick to the differential lateral cyclic inputs of the control system so as to produce differential lateral cyclic pitch as a function of collective stick input. Lewis felt that at high speed flight where the collective stick position is constant, that a constant differential lateral cyclic input would provide adequate efficiency.

Cheney recognized that the gyroscopic moments imposed upon rigid, counterrotating, coaxial rotors during maneuvers would produce blade stress and deflection in opposite directions, and taught in his U.S. Pat. No. 3,521,971 that a large fixed phase angle be used with each rotor. to introduce differential cyclic pitch to produce an aerodynamic moment to cancel the gyroscopic precession moments during these flight maneuvers.

It will therefore be seen that Bergquist, Michel and Fradenburg taught that differential lateral cyclic pitch in rigid, coaxial, counterrotating rotors should be introduced as a function of aircraft forward speed to produce optimum lift-to-drag ratio performance of the rotor in a steady state by selectively positioning the rotor lift vectors. Bergquist, Michel and Fradenburg did not address themselves to the cancellation of gyroscopic precession moments. Cheney taught the use of a large fixed phase angle in dual, counterrotating, coaxial, rigid rotors to cancel the gyroscopic precession moments created during maneuvers. We have come to the realization that Cheney's large fixed phase angle with cancel precession moments at one flight speed only and we now teach a control herein for a dual, counterrotating, coaxial, rigid rotor which will automatically optimally position the lift vectors on the rotors so as to produce optimum lift-to-drag ratio including cancellation of roll moments by these opposing lift vectors, and automatically cancel or minimize the gyroscopic precession moments at all flight speeds to thereby provide optimum helicopter performance and controllability in both steady state and maneuver mode of operation.

SUMMARY OF INVENTION

A primary object of the present invention is to provide a control for a dual, counterrotating, coaxial, rigid rotor which varies the phase angle of each rotor as a function of aircraft forward speed so that selected differential cyclic pitch is produced in response to cyclic pitch inputs to the rotors so as to selectively position the lift vectors of the rotors to produce optimum lift-to-drag ratio, and cancel or minimize the rotor gyroscopic precession moments at all flight speeds.

In accordance with the present invention, the phase angle of each rotor is varied in flight as a function of aircraft speed through a phase angle range of between about 20° and 70° for flight speeds between hover and 160 knots.

In accordance with a further aspect of the present invention, rotor phase angle is varied in flight automatically as a function of forward speed and serves to couple longitudinal cyclic input to the lateral cyclic controls so that the input of cyclic pitch control produces the desired differential cyclic pitch between the rotors.

BRIEF DESCRIPTION OF THE DRAWINGS

FIG. 2 is a showing of the effects of lag angle on response to a longitudinal input in the upper and lower rotors, when not compensated for.

FIG. 3 is a showing of the operation as for FIG. 2 of the upper and lower rotors when lag angle is compensated for. FIG. 3 also shows the gyroscopic vector generated by a pitch rate.

DESCRIPTION OF THE PREFERRED EMBODIMENT

Figure 1:
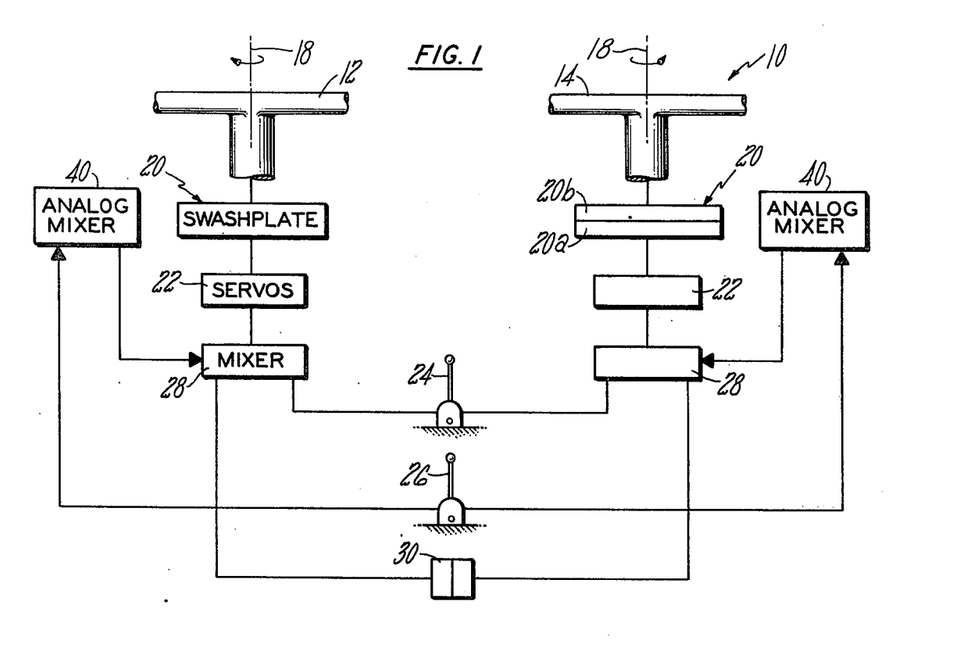
FIG. 1 is a schematic representation of the control system utilizing the invention, with the rotors shown side-by-side for purposes of illustration and explanation.

Referring to FIG. 1, we see dual, counterrotating, coaxial, rigid rotor and control system 10 which includes rigid rotors 12 and 14, which are supported in conventional fashion from a helicopter fuselage to generate lift by rotating about their common axis 18, although rotors 12 and 14 are shown side-by-side for purposes of illustration. Each of the rotors has its own control systems, which are preferably identical, and which include conventional swashplate assembly 20, which comprises stationary swashplate portion 20a and rotating swashplate portion 20b. Swashplate portion 20b is connected by conventional linkage to the pitch horns of the blades of rotors 12 and 14 so that motion of swashplate 20 along the rotor axis 18 will cause the rotor blades to vary pitch collectively and so that tilting of the swashplate 20 with respect to the axis 18 will cause the blades to vary pitch cyclically. Swashplate assembly 20 is caused to either translate, or tilt, or both by main servo mechanisms 22. Servo mechanisms 22 are controlled by inputs from the pilot collective stick 24, pilot cyclic stick 26, and foot pedals 30, which inputs are imparted to the servos 22 through mixer mechanism 28, cyclic stick 26 inputs having gone thru analog mixer 40.

To permit description of the rotor control system for the purpose of describing this invention, it is believed that the FIG. 1 showing and this description is adequate. Rotor and control assembly 10 may be of the type more fully disclosed in U.S. Pat. Nos. 3,409,249, 3,521,971 and 3,570,786.

In operation, and as described in greater particularity in the aforementioned patents, cyclic stick 26 is used to control helicopter pitch and roll. Collective stick 24 is used for vertical control, and pedals 30 are used for directional or yaw control. The collective stick 24 changes the blade pitch angle of each rotor equally for rotor thrust control. The cyclic stick 26 changes the blade angle cyclically and equally on each rotor for rotor pitch and roll moment control. Longitudinal cyclic input results in pitch maneuver and lateral cyclic input results in roll maneuver. The foot pedals 30 change the blade angles collectively but equally and oppositely on each rotor for directional or yaw control. Yaw is produced by the action of pedals 30 increasing collective pitch on upper rotor 14 and decreasing it on lower rotor 12 so that the torque generated by upper rotor 14 in a counterclockwise direction is greater to thereby produce a nose left yawing moment on the aircraft. A nose right yawing moment is created by pedals 30 increasing the collective pitch on lower rotor 12 and decreasing the collective pitch on upper rotor 14. For the purposes of future description, rotor 14 will be considered to be the upper rotor and rotating in a counterclockwise direction, as viewed from above, while rotor 12 is the lower rotor and rotating in a clockwise direction as viewed from above. The helicopter does not react instantaneously to a pilot initiated pitch angle change (feathering) of blades. The development of the maximum blade bending and helicopter control moment lags the blade pitch angle change, due to the flexibility of the blades of rotors 12 and 14. The significance of this lag may best be appreciated by viewing FIG. 2. Let us assume that we wish to impose a pitching moment over the nose of the helicopter, that is at azimuth angle 180°, and we therefore change blade pitch as the blade passed the azimuth 180° position. Due to the aforementioned lag in developing the control moment, the helicopter would not receive the maximum control moment from that blade pitch change at the nose or 180° azimuth location but, rather, at some angular location in the direction of blade rotation therefrom, for example, 180° + $\theta$, at the azimuth location M as shown in FIG. 2.

Figure 2:
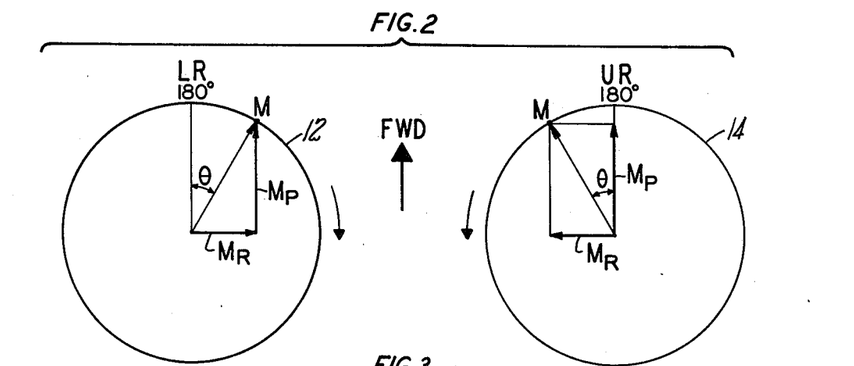
Figure 3:
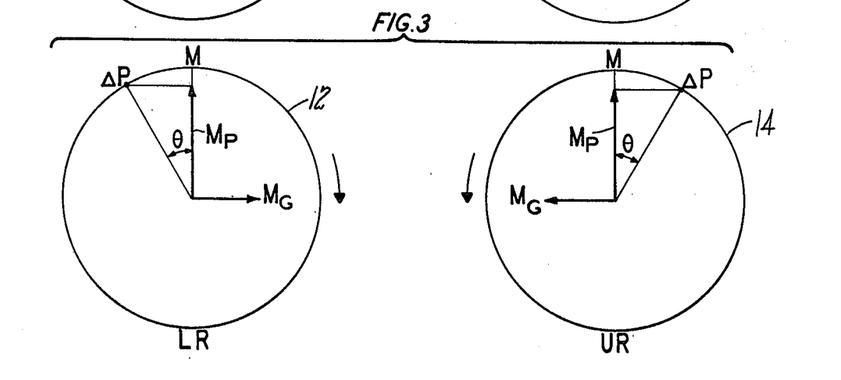
Figure 4:
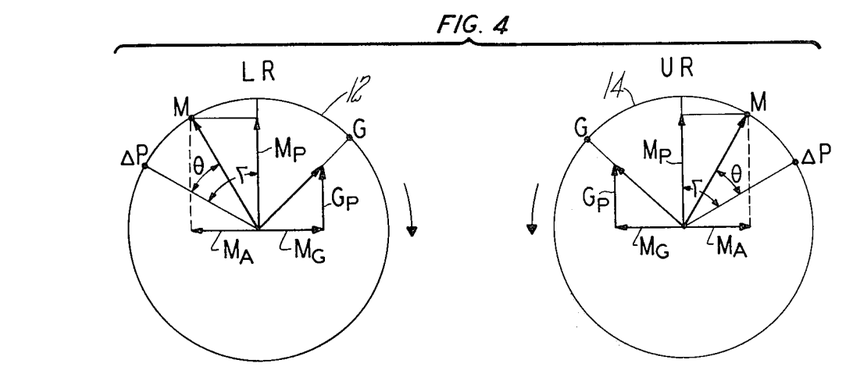
FIG. 4 demonstrates the use of phase angle to generate an aerodynamic moment in the upper and lower rotors to cancel or minimize the gyroscopic moments generated therein during aircraft maneuver.

By viewing FIG. 2, it will be noted that as a result of lag of angle $\theta$ forward (longitudinal) displacement of the cyclic stick 26 will produce both pitching moment ($M_P$) and roll moment ($M_R$) components on each rotor. The pitching moments $M_P$ are collective and produce the desired pitching acceleration in the aircraft. Since rotors 12 and 14 rotate in opposite directions, the roll moment components $M_R$ created by longitudinal cyclic stick motion cancel, but they produce undesirable bending stresses on each rotor shaft. Lag angle $\theta$ is about 30° for this type of rotor blade. These intershaft bending stresses can be minimized by adjusting each rotor swashplate 20 to account for the control moment lag. If the swashplate 20 of each rotor is repositioned in a direction opposite the rotor rotation an amount equal to the lag angle $\theta$ as shown in FIG. 3, maximum control moment $M_P$ in the desired 180° azimuth direction only will be developed, and intershaft bending will be reduced. By viewing FIG. 3 it will be evident that moment $M_P$ only has been developed in rotors 12 and 14 because the moment input lies along the fore-and-aft or longitudinal line of the aircraft, passing through the nose (180° azimuth position). As FIG. 3 illustrates, by this application of pitch change, no roll moment component $M_R$ is generated. However, as a result of the aircraft pitch acceleration additional moments identified as $M_G$ will be produced as a result of the gyroscopic precession characteristic of the rotors. While the roll producing tendencies of the upper rotor moment will be cancelled by that of the lower rotor, adverse blade bending stresses and deflections will result. As taught by Cheney, if the swashplates 20 are adjusted to a considerably larger angle, for example, to about double that shown in the FIGS. 2 and 3 illustrations to a phase angle gamma (Γ), the results shown in FIGS. 4 and 5 will be achieved. Namely, reoriented aerodynamic moments will be produced automatically which will balance the adverse blade bending moments due to gyroscopic moments created by changes in aircraft attitude during maneuvering flight. In this fashion, excessive rotor blade stresses are avoided, and blade tip clearance is maintained during maneuvers. FIG. 4 illustrates the effect of applying a control pitch change input at azimuth station ΔP of rotors 12 and 14 so as to develop a blade bending moment due to aerodynamic forces at azimuth station M. Moment M so developed in FIG. 4 can be vectorized as shown into pitch change moments $M_P$, which cause blade pitching motions, and lateral aerodynamic moments $M_A$, which corresponds to the roll moment $M_R$ illustrated in FIG. 2. It must be borne in mind that in the FIG. 4 illustration, the helicopter is in maneuver mode of operation and is accordingly changing attitude in response to the moments imposed thereon. It is a characteristic of helicopter rotors, as fully explained in Cheney U.S. Pat. No. 3,521,971, that a gyroscopic moment is imposed upon the helicopter in response to attitude change at an azimuth station G which is 90° forward of the attitude changing moments M. The gyroscopic moment illustrated at station G can be vectorized into additive gyroscopic pitch moments $G_P$, which cooperate with the aerodynamically imposed pitch moments $M_P$ to cause pitching motions of the aircraft, and lateral gyroscopic moment $M_G$, corresponding to roll moment $M_R$ in FIG. 2. It will be noted by viewing FIG. 4 that in each of rotors 12 and 14 the aerodynamic induced roll moment $M_A$ cancels the gyroscopic roll moment $M_G$, thereby cancelling the blade bending moments caused by those gyroscopic forces created during maneuvering flight operation. FIG. 4 thus demonstrates that by the proper selection of phase angle gamma, differential pitch coupling which produce aerodynamic moments $M_A$ will automatically be generated in each rotor which will cancel the adverse effects produced by the gyroscopic moment $M_G$ developed during maneuver operations. It will be evident to those skilled in the art that aerodynamic moment $M_A$ of FIG. 4 will always reduce the effect of gyroscopic moment $M_G$, and will cancel it when $M_A = M_G$.

Figure 5:
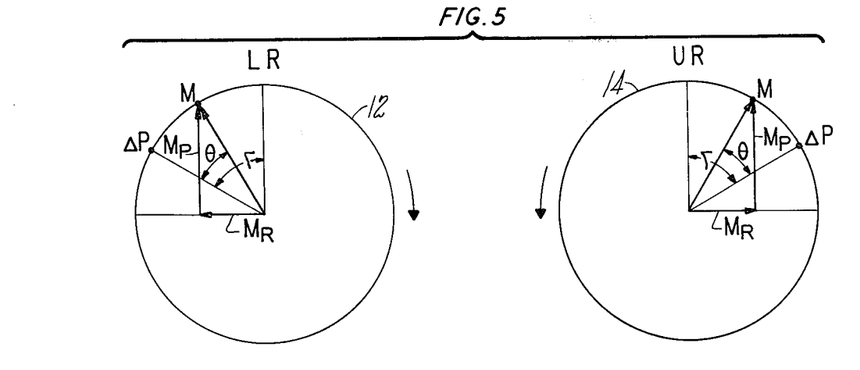
FIG. 5 demonstrates the use of phase angle during steady state operation to produce differential lateral cyclic blade pitch between the rotors to cancel roll moment and position the lift vector of each rotor for optimum lift-to-drag ratio performance.

FIG. 5 illustrates the benefit to be gained automatically by the selected phase angle gamma equal to the FIG. 4 phase angle during steady state operation rather than maneuvering operation. By viewing the FIG. 5 illustration wherein the phase angle gamma is again substantially larger than the lag angle θ, we see that in steady state operation, when control input produces blade pitch change at station ΔP, differential pitch coupling develops aerodynamic moment $M_A$ on each rotor at station M. This aerodynamic moment can be vectorized into additive pitch moment $M_P$ and cancelling rolling moments $M_R$. The roll moments $M_R$ when produced are aerodynamic moments which produce differential lateral cyclic control inputs to rotors 12 and 14 to selectively position the lift vectors L on each rotor 12 and 14 so as to also produce optimum lift-to-drag ratio to optimize rotor efficiency.

It will accordingly be noted by viewing FIGS. 4 and 5 that by utilizing a selected phase angle gamma, an aerodynamic moment $M_A$ is developed during aircraft maneuver operation which will cancel or minimize the gyroscopic moment $M_G$ developed by change of aircraft or rotor attitude during maneuver and will also produce during steady state operation differential lateral cyclic pitch to optimally position the lift vector of each rotor to produce optimum lift-to-drag ratio of the rotors.

Figure 6:
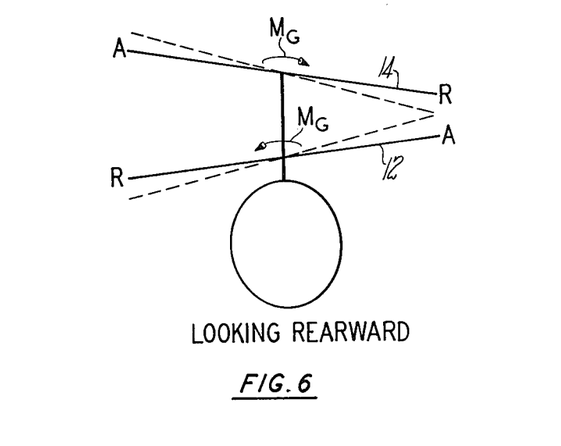
FIG. 6 is a front view of a helicopter using dual, rigid, counterrotating, coaxial rotors to show the effects of gyroscopic moments created on the rotors during maneuver operation and to show the stabilizing results of generating an aerodynamic moment to compensate gyroscopic moment.

The significance of cancelling the gyroscopic moment $M_G$ as described in connection with FIG. 4 will be best appreciated by viewing FIG. 6, which is a front view of a helicopter using coaxial, counterrotating, rigid rotors and with the gyroscopic moments $M_G$ imposed as illustrated to cause the rotors 12 and 14 to move from their solid line positions to their dotted line gyroscopically loaded positions and thereby bring the advancing blade A of rotor 12 and the retreating blade R of rotor 14 into close proximity. The automatic introduction of differential lateral pitch coupling as a function of a longitudinal pitch input will produce aerodynamic moments which will act equally and oppositely to the gyroscopic precession generated moments $M_G$. Such action permits the rotors to remain in their FIG. 6 solid line positions where they present no tip clearance problems and experience minimal blade and intershaft stress. FIG. 6 demonstrates that the offset lift vector to produce optimum lift-to-drag rotor performance produces rotor canting as shown in solid lines and this is why cancellation of gyroscopic moments is very important to maintain adequate tip clearance, especially at high speed.

Figure 7:
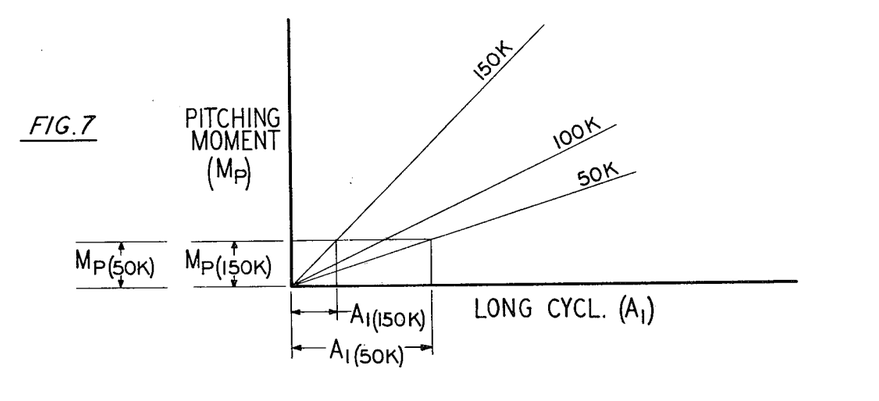
FIG. 7 is a graph of longitudinal cyclic pitch A and pitching moment $M_P$ for various aircraft forward speed operating regimes.

While Cheney taught that a fixed phase angle be used to counteract gyroscopic moments produced during helicopter maneuvering, we have discovered that it is preferred to vary phase angle in flight as a function of helicopter forward speed V in order to achieve optimum L/D and stall margins at all speeds; gyroscopic cancellation, particularly at high speed; and a lack of requirement for separate differential lateral cyclic. This need is best understood by viewing FIGS. 7, 8 and 9. An explanation of FIGS. 7–9 will illustrate that for a given aircraft maneuver, such as a 1 radian/sec$^2$ maneuver, different rotor phase angles need be used to produce aerodynamic moments to cancel or minimize the gyroscopic moments created dring this maneuver as the forward speed V of the helicopter changes. We will first consider this maneuver when the helicopter is operating at 150 knots. As shown in FIG. 7, a longitudinal cyclic control input $A_1$ (150k) is required to produce the pitching moment or pitching acceleration $M_P$ (150k) to initiate the maneuver. Viewing FIG. 8, we see that the pitching moment $M_P$ (150k) produced in FIG. 7 produces a gyroscopic moment $M_G$ (150k). Now viewing FIG. 9, we note that the same longitudinal cyclic input $A_1$ (150k) as in FIG. 7 will produce an aerodynamic moment $M_A$ (150k) equal to gyroscopic moment $M_G$ (150k) when a large phase angle $Γ_1$ is used.

Figure 8:
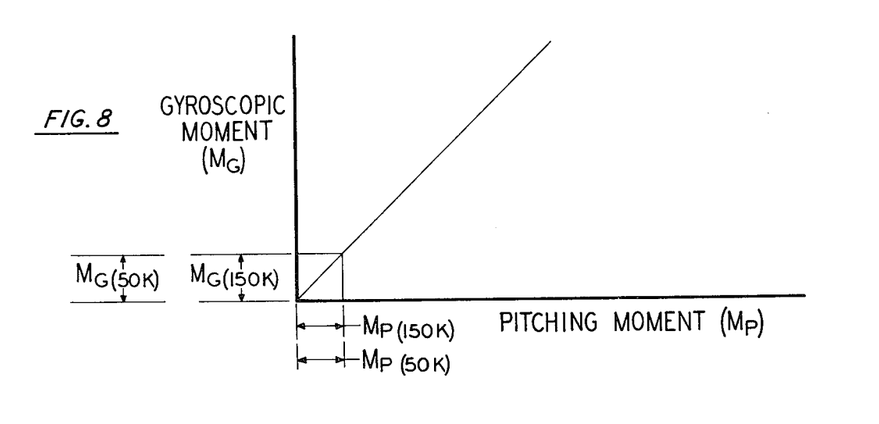
FIG. 8 is a graph of pitching moment $M_P$ and gyroscopic moment $M_G$.
Figure 9:
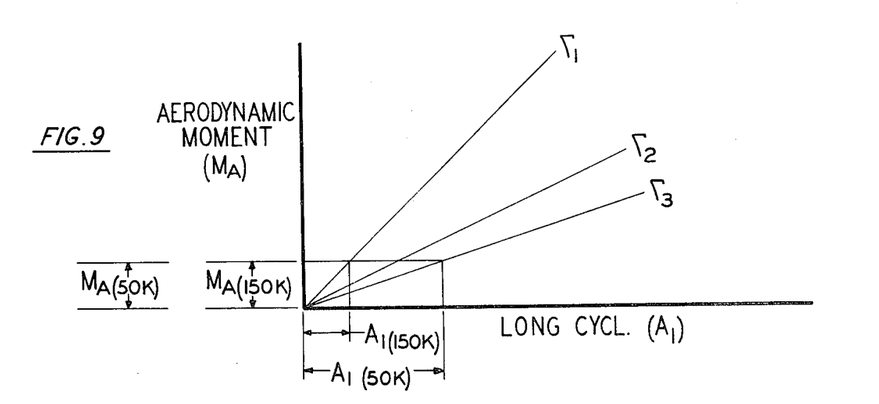
FIG. 9 is a graph of longitudinal cyclic pitch A, and aerodynamic moment $M_A$ for various rotor phase angles.

Now, let us assume that the helicopter is operating at a forward speed of 50 knots rather than at 150 knots as in the original illustration, and the pilot decides to perform the same 1 radian/sec$^2$ maneuver. At forward velocity V of 50 knots, a greater amount of longitudinal cyclic pitch $A_1$ (50k) will have to be imposed to produce this maneuver. FIG. 7 shows that $A_1$ (50k) produces the same pitching moment $M_P$ (50k) as at 150k. It will be noted that $M_P$ (150k) is equal to $M_P$ (50k) since the same maneuver is being executed. Now going to FIG. 8 and imposing our pitching moment $M_P$ (50k)

thereon, it will be noted that a gyroscopic moment $M_G$ (50k) is produced which is equal to $M_G$ (150k). By viewing FIG. 9, it will be noted that when we impose the same longitudinal cyclic pitch inputs $A_1$ (50k) as in FIG. 7 we need to have a smaller phase angle $\Gamma_3$ to produce an aerodynamic moment $M_A$ (50k) which will cancel the gyroscopic moment $M_G$ (50k). It will be obvious by viewing FIG. 9 that had our phase angle remained at $\sigma_1$ during both the 150 knot and 50 knot maneuver, an aerodynamic moment would have been developed at the 50 knot maneuver which would have been considerably larger than the gyroscopic moment so that moment cancellation would not occur.

Figure 10:
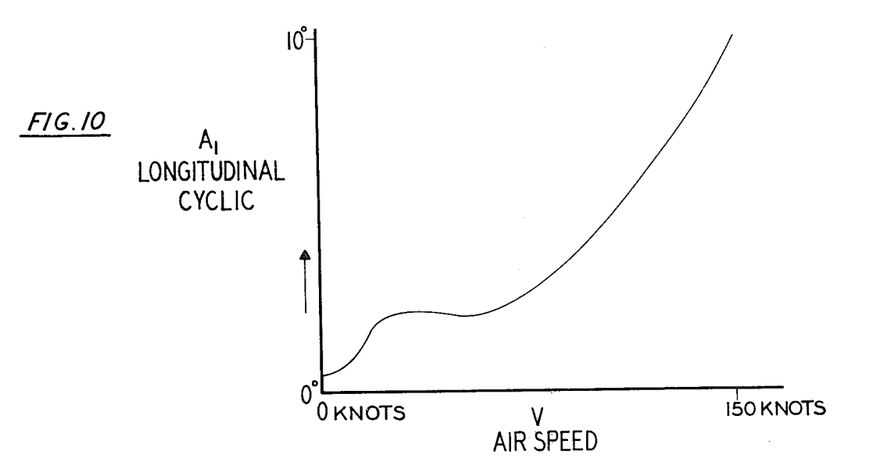
FIG. 10 is a graph showing the longitudinal cyclic pitch required to overcome drag and produce stable flight attitude for an aircraft having dual, counterrotating, coaxial rigid rotors at forward flight operation between hover and 150 knots.
Figure 11:
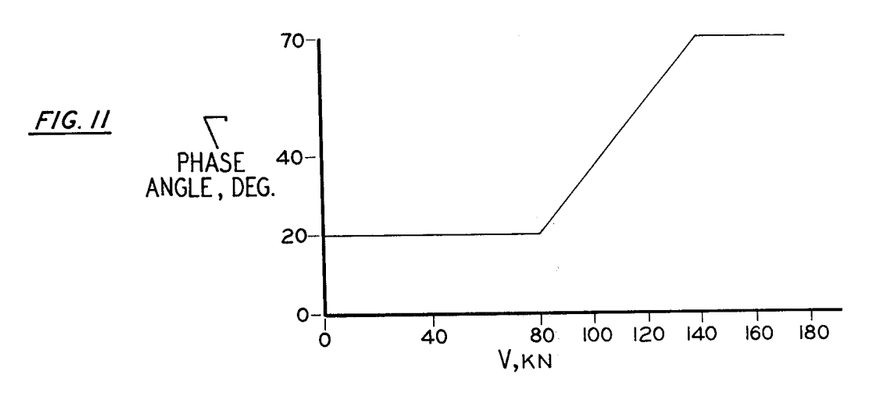
FIG. 11 is a graph showing the rotor phase angle required to produce optimum rotor performance and controllability between hover and 160 knots without additional differential lateral cyclic.
Figure 12:
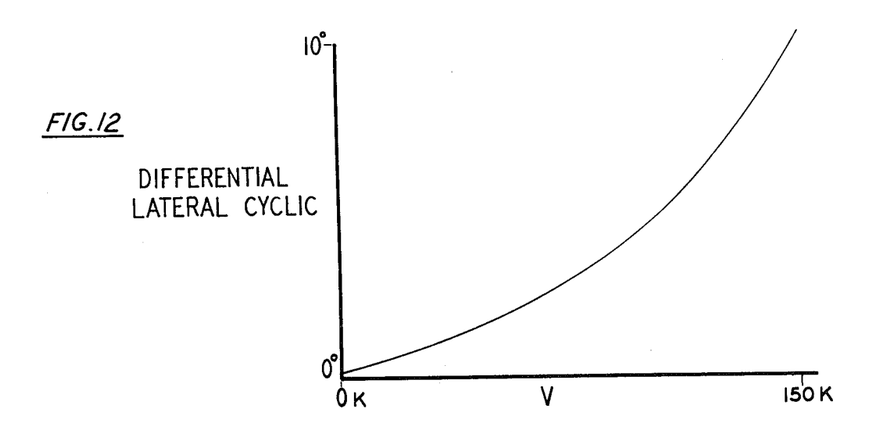
FIG. 12 is a graph showing the differential lateral cyclic pitch input required to produce optimum performance and controllability between hover and 150 knots including cancelling the roll moments, and selectively positioning the rotor lift vectors to produce optimum lift-to-drag ratio in steady state flight.

We have discovered that it is a characteristic of a helicopter using this type of rotor system that, as best shown in FIG. 10, varying degrees of longitudinal cyclic input are required to overcome aircraft drag and put the aircraft in equilibrium at all forward speeds. From the Bergquist patent it is known that the proper amount of differential lateral cyclic pitch input required to produce the optimum lift vector offset is substantially as represented in FIG. 12. Through analytical and developmental work with a helicopter powered by a counter-rotating, coaxial, rigid rotor, we have determined that for gyroscopic moment cancellation or minimization, the phase angle $\Gamma$ of rotors 12 and 14 need be varied to produce the optimum performance and controllability of the aircraft throughout the flight regime. The curve of FIG. 11 provides a programmed phase angle variation which is addressed to meeting these three criteria. A phase angle of about 20° is used for the flight regime between hover and about 80 knots, the phase angle is gradually increased to 70° in a flight range between about 80 knots and about 140 knots, and a phase angle of about 70° is used for a flight regime between about 140 and about 160 knots. FIG. 11 shows our presently preferred phase angle variation but it will be evident that there are acceptable variations on each side thereof. The FIG. 11 curve is the presently preferred curve and takes into account vibration and trim considerations to produce the results and advantages discussed supra.

This programmed phase angle variation thus serves to couple longitudinal cyclic pitch and lateral cyclic pitch as described in connection with FIG. 5 so that the application of longitudinal cyclic pitch input required to overcome aircraft drag and maintain the aircraft in equilibrium at all forward flight speeds and illustrated in FIG. 10 will automatically produce differential lateral cyclic pitch in rotors 12 and 14 to thereby achieve the desired differential lateral cyclic in accordance with the curve shown in FIG. 12 so that the differential lateral cyclic pitch derived thereby at the various aircraft speeds will serve to produce offset lift vectors positioned in accordance with the dictates of the FIG. 12 graph to produce optimum lift-to-drag ratio operation, and hence maximum efficiency operation and controllability of rotors 12 and 14. In addition, as illustrated in FIG. 4, the gyroscopic moment cancellation, in whole or in part, will be accomplished as described heretofore.

Figures 13, 14:
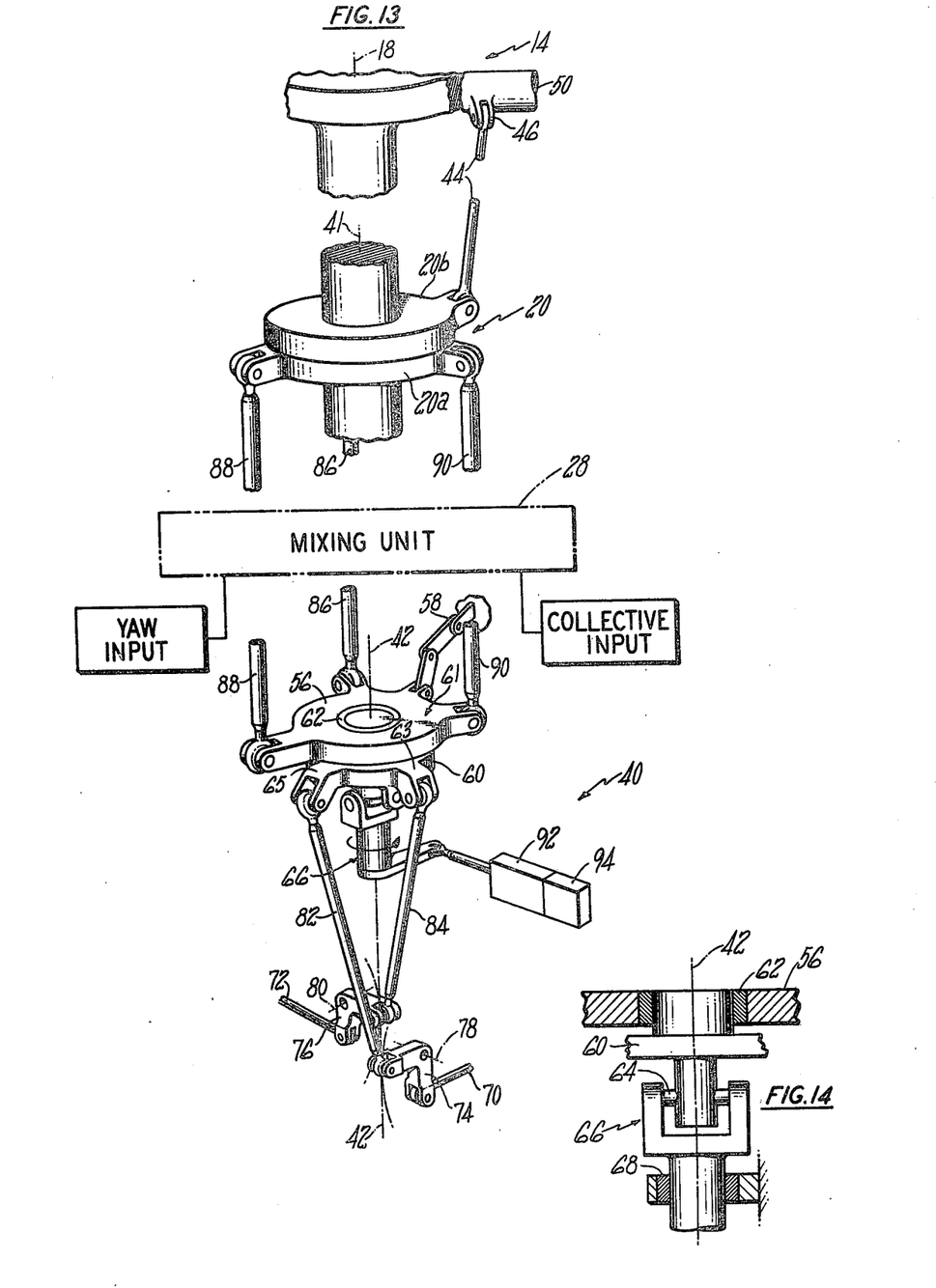
FIG. 13 is a showing of the analog mixer used to vary rotor phase angle as a function of aircraft forward speed.
FIG. 14 is a cross-sectional showing through a portion of the analog mixer of FIG. 13.

Rotor phase angle is preferably caused to vary in flight as a function of aircraft speed V by means of an analog mixer 40 which is shown schematically connected to the swashplate 20 of each rotor in the FIG. 1 schematic and one of which is shown in detail in FIGS. 13 and 14. The analog mixer 40 will be described as it applies to rotor 14 only, since the analog mixer used for rotor 12 is identical thereto. Analog mixer 40 is connected to the nonrotating portion 20a of swashplate 20, which supports rotating swashplate portion 20b for rotation therefrom about axis 41. Swashplate rotating portion 20b is connected in conventional fashion by push rod members 44 to the pitch horn 46 of each blade 50 of rotor 14.

When swashplate 20 translates with respect to axis 41, it causes all blades 50 to change pitch simultaneously in collective pitch change action. When swashplate 20 pivots about any horizontal axis passing through axis 41, it causes cyclic pitch variations to the blades 50. Analog mixer 40 is connected to swashplate 20 and serves the function of varying the rotor phase angle gamma ($\Gamma$) by establishing the horizontal axis about which swashplate 20 will be caused to tilt by longitudinal and lateral cyclic control inputs from pilot cyclic control stick 26. Mixing unit 28 is preferably positioned between analog mixer 40 and swashplate 20 and is of conventional design to combine cyclic and collective inputs and so that the cyclic control output of mixer 40 is imparted to swashplate 20 with any required coupling, gain or the like, to produce the required phase angle shift as a function of forward speed V.

Analog mixer 40 consists of upper nonrotating member 56 which is connected to the fuselage or otherwise prevented from rotation about mixer axis 42 by scissors member 58. Lower rotatable plate member 60 is joined to nonrotatable member 56 by an internal antifriction bearing 62, best shown in FIG. 14, thereby permitting member 60 to rotate about axis 42 with respect to nonrotating member 56. Lower plate member 60 is joined to the trunnion 64 of universal joint member 66, which is supported from the fuselage or other fixed member within antifriction bearing 68 so as to be free to rotate about mixer axis 42, which is preferably vertical. Universal joint 66 permits members 56 and 60 to pivot in unison about any horizontal axis passing through axis 42 as dictated by control inputs. Further, when universal joint 66 rotates about axis 42, it causes plate 60 to rotate about axis 42 with respect to plate 56. These plate members 56 and 60 are caused to tilt or pivot about a selected horizontal axis by control input motions imparted thereto by either pilot lateral cyclic pitch input member 70 or longitudinal cyclic input member 72. Members 70 and 72 cause bellcranks 74 and 76 to pivot about axes 78 and 80 and thereby cause input rods 82 or 84 to provide lateral or longitudinal cyclic control input motion to swashplate members 56 and 60, thereby causing those plates to pivot or tilt about a selected horizontal axis. Input rods 82 and 84 are joined to bellcranks 74 and 76 and to swashplate member 60 by spherical bearings. Rods 82 and 84 connect to swashplate member 60 at azimuth stations spaced 90° apart. Nonrotating member 56 is connected to nonrotating member 20a of the main swashplate through mixer unit 28 in conventional fashion so that the tilting motion about a selected tilting axis which is imparted to the analog mixer swashplate members 56 and 60 is similarly and precisely imparted to the main swashplate 20 so as to establish the selected cyclic pitch change in blades 50. Analog mixer member 40 is schematically shown connected to swashplate 20 through mixer unit 28 by rod members 86, 88, and 90.

In operation, analog mixer 40 is caused to change the phase angle of rotor 14 as a function of aircraft flight speed V by the use of actuator mechanism 92, which is programmed by aircraft speed sensing mechanism 94 to cause universal joint 66 and hence swashplate 60 to rotate with respect to swashplate member 56 about axis 42, thereby establishing the horizontal axis about which swashplates 56–60 and hence main swashplate 20 will tilt in response to cyclic inputs from pilot control rods 70 and 72. The selection of this horizontal axis about which the swashplate member 20 tilts determines the station ΔP in the rotor azimuth at which blade pitch change takes place as a result of cyclic stick inputs, and hence determines the phase angle gamma (Γ) of the rotor. By programming actuator 92 from aircraft speed responsive member 94, it will be seen that the rotor phase angle is caused to vary in flight as a function of aircraft forward speed V.

It is an important teaching of this invention that the operating radii of bellcranks 74 and 76 be coincident with analog mixer axis 42 so that the phase change rotation of member 60 by aircraft speed responsive mechanism 92–94 will cause control rods 82 and 84 to merely translate along the surface of a cone and thereby avoid imparting any undesired control inputs to the rotor during phase change variation of the analog mixer 40.

While the analog mixer 40 is shown used with the rigid rotor in this application, it will be evident to those skilled in the art that it is equally applicable for use with a hinged or any other type of rotor capable of having its phase angle changed.

While we have described our invention in relation to a counterrotating, coaxial rigid rotor for helicopters, it will be evident to those skilled in the art that the teaching herein is equally applicable to any counterrotating, rigid rotor system and to rotors other than used in the helicopter field.

Throughout the description, we have talked about moment cancellation but it will be evident to those skilled in the art that complete moment cancellation will be achieved only under selected circumstances and that moment cancellation is otherwise partially achieved so that the effects of undesired moments are minimized.

We wish it to be understood that we do not desire to be limited to the exact details of construction shown and described, for obvious modifications will occur to a person skilled in the art.

We claim:

1. The method of optimally positioning the lift vectors of rigid counterrotating helicopter rotors so as to produce maximum rotor lift-to-drag ratio and so that the rotor roll moments preferably cancel or minimize, and further so that an aerodynamic moment is generated in each rotor to cancel the gyroscopic precession moment caused by rotor axis tilting comprising selectively varying the phase angle of the counterrotating rotors as a function of a helicopter forward speed.

2. A method according to claim 1 wherein the phase angle increases with helicopter forward speed.

3. The method according to claim 1 wherein the phase angles of the counterrotating rotors are equal and opposite and vary between about 70° at flight speed of about 150 knots and 20° for hover.

4. The method according to claim 1 wherein the phase angles of the counterrotating rotors are equal and opposite and vary between about 20° from hover to about 80 knots, between 20° and 70° between about 80 and 140 knots, and about 70° between about 140 and 160 knots.

5. The method of operating dual, counterrotating, rigid rotors comprising coupling lateral cyclic to longitudinal cyclic pitch control through phase angle and varying the phase angle as a function of aircraft forward speed to produce optimal differential cyclic pitch control to the rotors.

6. A method according to claim 5 wherein the phase angle increases with helicopter forward speed.

7. The method according to claim 5 wherein the phase angles of the counterrotating rotors are equal and opposite and vary between about 70° at flight speed of about 150 knots and 20° for hover.

8. The method according to claim 5 wherein the phase angles of the counterrotating rotors are equal and opposite and vary between about 20° from hover to about 80 knots, between 20° and 70° between about 80 and 140 knots, and about 70° between about 140 and 160 knots.

9. The method of operating a helicopter having counterrotating rigid rotors comprising varying the phase angle of each rotor simultaneously as a function of vehicle forward speed to optimize performance and controllability.

10. A method according to claim 9 wherein the phase angle increases with helicopter forward speed.

11. The method according to claim 9 wherein the phase angles of the counterrotating rotors are equal and opposite and vary between about 70° at flight speed of about 150 knots and 20° for hover.

12. The method according to claim 9 wherein the phase angles of the counterrotating rotors are equal and opposite and vary between about 20° from hover to about 80 knots, between 20° and 70° between about 80 and 140 knots, and about 70° between about 140 and 160 knots.

13. The method of operating a helicopter having counterrotating rigid rotors comprising producing selected differential lateral cyclic control to the rotors to achieve optimum performance and controllability by automatically varying the control phase angle of each rotor as a function of vehicle forward flight speed.

14. A method according to claim 13 wherein the phase angle increases with helicopter forward speed.

15. The method according to claim 13 wherein the phase angles of the counterrotating rotors are equal and opposite and vary between about 70° at flight speed of about 150 knots and 20° for hover.

16. The method according to claim 13 wherein the phase angles of the counterrotating rotors are equal and opposite and vary between about 20° from hover to about 80 knots, between 20° and 70° between about 80 and 140 knots, and about 70° between about 140 and 160 knots.

17. The method of optimally positioning the lift vectors of rigid counterrotating helicopter rotors so as to produce maximum rotor lift-to-drag ratio and further so that an aerodynamic moment is generated in each rotor to cancel or minimize the gyroscopic precession moment caused by rotor axis tilting comprising coupling longitudinal cyclic control input to lateral cyclic control input through rotor phase angle and selectively varying rotor phase angle as a function of helicopter forward speed so that the introduction of longitudinal cyclic control input will produce optimum differential lateral cyclic control.

18. A method according to claim 17 wherein the phase angle increases with helicopter forward speed.

19. The method according to claim 17 wherein the phase angles of the counterrotating rotors are equal and opposite and vary between about 70° at flight speed of about 150 knots and 20° for hover.

20. The method according to claim 17 wherein the phase angles of the counterrotating rotors are equal and opposite and vary between about 20° from hover to about 80 knots, between 20° and 70° between about 80 and 140 knots, and about 70° between about 140 and 160 knots.

21. The method of operating a helicopter having counterrotating rigid rotors comprising varying the phase angles of each rotor as a direct function of airspeed so that the coupled longitudinal and lateral cyclic controls introduce differential cyclic inputs during helicopter attitude changes to automatically produce aerodynamic moments in magnitude and direction in each rotor to cancel or minimize the moments created therein by the gyroscopic precession characteristics of the rotors, and to introduce differential lateral cyclic inputs during helicopter steady state operation to automatically produce aerodynamic moments in magnitude and direction in each rotor to produce lift vector of preselected offset to produce optimum lift-to-drag ratio at varying airspeed.

22. A method according to claim 21 wherein the phase angle increases with helicopter forward speed.

23. The method according to claim 21 wherein the phase angles of the counterrotating rotors are equal and opposite and vary between about 70° at flight speed of about 150 knots and 20° for hover.

24. The method according to claim 21 wherein the phase angles of the counterrotating rotors are equal and opposite and vary between about 20° from hover to about 80 knots, between 20° and 70° between about 80 and 140 knots, and about 70° between about 140 and 160 knots.

25. The method of operating a helicopter having counterrotating, rigid rotors comprising varying the phase angles of each rotor as a direct function of airspeed so that the coupled longitudinal and lateral cyclic controls introduce differential cyclic inputs during helicopter steady state operation to automatically produce aerodynamic moments in magnitude and direction in each rotor to produce lift vector of preselected offset to produce optimum lift-to-drag ratio at all airspeeds.

26. A method according to claim 25 wherein the phase angle increases with helicopter forward speed.

27. The method according to claim 25 wherein the phase angles of the counterrotating rotors are equal and opposite and vary between about 70° at flight speed of about 150 knots and 20° for hover.

28. The method according to claim 25 wherein the phase angles of the counterrotating rotors are equal and opposite and vary between about 20° from hover to about 80 knots, between 20° and 70° between about 80 and 140 knots, and about 70° between about 140 and 160 knots.

29. The method of operating a helicopter having counterrotating rigid rotors comprising varying the phase angles of each rotor as a direct function of airspeed so that the coupled longitudinal and lateral cyclic controls introduce differential cyclic inputs during helicopter attitude changes to automatically produce aerodynamic moments in magnitude and direction in each rotor to cancel or minimize the moments created therein by the gyroscopic precession characteristics of the rotors.

30. A method according to claim 29 wherein the phase angle increases with helicopter forward speed.

31. The method according to claim 29 wherein the phase angles of the counterrotating rotors are equal and opposite and vary between about 70° at flight speed of about 150 knots and 20° for hover.

32. The method according to claim 29 wherein the phase angles of the counterrotating rotors are equal and opposite and vary between about 20° from hover to about 80 knots, between 20° and 70° between about 80 and 140 knots, and about 70° between about 140 and 160 knots.

33. A control for a helicopter rotor system utilizing two, rigid, counterrotating rotors including means to selectively vary the phase angle of the rotors as a function of helicopter forward speed to both optimally position the rotor lift vectors so as to produce maximum rotor lift-to-drag ratio performance, and generate an aerodynamic moment in each rotor to cancel or minimize the gyroscopic precession moment created during maneuver.

34. A control according to claim 33 wherein said means causes the phase angle to increase with helicopter forward speed.

35. A control according to claim 33 wherein said means causes the phase angles of the rotor to be equal and opposite and vary between about 70° at flight speed of about 150 knots and 20° for hover.

36. A control according to claim 33 wherein said means causes the phase angles of the counterrotating rotors to be equal and opposite and vary between about 20° from hover to about 80 knots, between 20° and 70° between about 80 and 140 knots, and about 70° between about 140 and 160 knots.

37. A control for a rotor system utilizing two, rigid, counterrotating rotors comprising means to couple lateral cyclic to longitudinal cyclic pitch control of each rotor through rotor phase angle so that as rotor phase angle increases as a function of helicopter forward speed, optimum differential cyclic input is imparted to the rotors.

38. A control according to claim 37 wherein said means causes the phase angle to increase with helicopter forward speed.

39. A control according to claim 37 wherein said means causes the phase angles of the counterrotating rotors to be equal and opposite and vary between about 70° at flight speed of about 150 knots and 20° for hover.

40. A control according to claim 37 wherein said means causes the phase angles of the counterrotating rotors to be equal and opposite and vary between about 20° from hover to about 80 knots, between 20° and 70° between about 80 and 140 knots, and about 70° between about 140 and 160 knots.

41. A control for a helicopter rotor system utilizing two, rigid, counterrotating rotors including means for varying the phase angle of each rotor simultaneously as a function of helicopter forward speed to optimize performance and controllability.

42. A control according to claim 41 wherein said means causes the phase angle to increase with helicopter forward speed.

43. The control according to claim 41 wherein said means causes the phase angles of the counterrotating rotors to be equal and opposite and vary between about 70° at flight speed of about 150 knots and 20° for hover.

44. The control according to claim 41 wherein said means causes the phase angles of the counterrotating rotors to be equal and opposite and vary between about 20° from hover to about 80 knots, between 20° and 70° between about 80 knots and 140 knots, and about 70° between about 140 and 160 knots.

45. A control for a helicopter rotor system utilizing two, rigid, counterrotating rotors comprising means to produce selected differential lateral cyclic control to the rotors to achieve optimum performance and controllability by automatically varying the control phase angle of each rotor as a function of helicopter forward speed.

46. A control according to claim 45 wherein said means causes the phase angle to increase with helicopter forward speed.

47. The control according to claim 45 wherein said means causes the phase angles of the counterrotating rotors to be equal and opposite and vary between about 70° at flight speed of about 150 knots and 20° for hover.

48. A control according to claim 45 wherein said means causes the phase angles of the counterrotating rotors to be equal and opposite and vary between about 20° from hover to about 80 knots, between 20° and 70° between about 80 and 140 knots, and about 70° between about 140 and 160 knots.

49. A control for a helicopter rotor system utilizing two, rigid, counterrotating rotors comprising means to couple longitudinal cyclic control input to lateral cyclic control input through rotor phase angle and selectively varying rotor phase angle as a function of helicopter forward speed thereby optimally positioning the lift vectors of the rotors to produce maximum rotor lift-to-drag ratio performance and to also develop an aerodynamic moment to cancel or minimize gyroscopic precession moments during helicopter maneuver.

50. A control according to claim 49 wherein said means causes the phase angle to increase with helicopter forward speed.

51. The control according to claim 49 wherein said means causes the phase angles of the counterrotating rotors to be equal and opposite and vary between about 70° at flight speed of about 150 knots and 20° for hover.

52. The control according to claim 49 wherein said means causes the phase angles of the counterrotating rotors to be equal and opposite and vary between about 20° from hover to about 80 knots, between 20° and 70° between about 80 and 140 knots, and about 70° between about 140 and 160 knots.

53. A control for a helicopter rotor system utilizing two, rigid, counterrotating rotors including means to vary the phase angles of each rotor as a direct function of airspeed so that the coupled longitudinal and lateral cyclic controls introduce differential cyclic inputs during helicopter attitude changes to automatically produce aerodynamic moments in magnitude and direction in each rotor to cancel or minimize the moments created therein by gyroscopic precession of the rotors, and which also introduce differential lateral cyclic inputs during helicopter steady state operation to automatically produce aerodynamic moments in magnitude and direction in each rotor to produce selected lift vector offset resulting in optimum lift-to-drag ratio rotor performance.

54. A control according to claim 53 wherein said means causes the phase angle to increase with helicopter forward speed.

55. The control according to claim 53 wherein said means causes the phase angles of the counterrotating rotors to be equal and opposite and vary between about 70° at flight speed of about 150 knots and 20° for hover.

56. The control according to claim 53 wherein said means causes the phase angles of the counterrotating rotors to be equal and opposite and vary between about 20° from hover to about 80 knots, between 20° and 70° between about 80 and 140 knots, and about 70° between about 140 and 160 knots.

57. A control for a helicopter rotor system utilizing two, rigid, counterrotating rotors including means to vary the phase angles of each rotor as a direct function of airspeed so that the coupled longitudinal and lateral cyclic controls introduce differential cyclic inputs during helicopter attitude changes to automatically produce aerodynamic moments in magnitude and direction in each rotor to cancel or minimize the moments created therein by gyroscopic precession of the rotors.

58. A control according to claim 57 wherein said means causes the phase angle to increase with helicopter forward speed.

59. A control according to claim 57 wherein said means causes the phase angles of the counterrotating rotors to be equal and opposite and vary between about 70° at flight speed of about 150 knots and 20° for hover.

60. The control according to claim 57 wherein said means causes the phase angles of the counterrotating rotors to be equal and opposite and vary between about 20° from hover to about 80 knots, between 20° and 70° between about 80 and 140 knots, and about 70° between about 140 and 160 knots.

61. A control for a helicopter rotor system utilizing two, rigid, counterrotating rotors including means to vary the phase angles of each rotor as a direct function of airspeed so that the coupled longitudinal and lateral cyclic controls introduce differential cyclic inputs during helicopter steady state operation to automatically produce aerodynamic moments in magnitude and direction in each rotor to produce selected lift vector offset resulting in optimum lift-to-drag ratio rotor performance.

62. A control according to claim 61 wherein said means causes the phase angle to increase with helicopter forward speed.

63. The control according to claim 61 wherein said means causes the phase angles of the counterrotating rotors to be equal and opposite and vary between about 70° at flight speed of about 150 knots and 20° for hover.

64. The control according to claim 61 wherein said means causes the phase angles of the counterrotating rotors to be equal and opposite and vary between about 20° from hover to about 80 knots, between 20° and 70° between about 80 and 140 knots, and about 70° between about 140 and 160 knots.

* * * * *

UNITED STATES PATENT OFFICE
CERTIFICATE OF CORRECTION

PATENT NO. : 4,008,979
DATED : February 22, 1977
INVENTOR(S) : DEAN E. COOPER and ROBERT F. KLINGLOFF It is certified that error appears in the above-identified patent and that said Letters Patent are hereby corrected as shown below:

Column 1, line 34: "motor" should read -- rotor --

Column 7, line 9: "o1 " should read -- /17 --

Column 7, line 27: "the" should be deleted.

Signed and Sealed this

Third Day of May 1977

[SEAL]

Attest:

RUTH C. MASON
Attesting Officer

C. MARSHALL DANN
Commissioner of Patents and Trademarks